United States Patent

[11] 3,570,416

| [72] | Inventor | Jackson A. Shook<br>Northville, Mich. |
|---|---|---|
| [21] | Appl. No. | 685,980 |
| [22] | Filed | Nov. 27, 1967 |
| [45] | Patented | Mar. 16, 1971 |
| [73] | Assignee | Evans Products Company<br>Continuation of application Ser. No.<br>482,576, Aug. 25, 1965, now abandoned. |

[54] FREIGHT-BRACING APPARATUS
4 Claims, 7 Drawing Figs.

[52] U.S. Cl. ............................................. 105/376
[51] Int. Cl. ............................................. B60p 7/14
[50] Field of Search .............................................. 105/369
(B), 376; 292/36, 336.3, M, L; 74/102, 105, 491;
248/354; 280/106

[56] References Cited

UNITED STATES PATENTS

| 430,944 | 6/1890 | Hammerl ..................... | 62/459 |
| 896,157 | 8/1908 | Roberts ....................... | 81/173 |
| 1,370,109 | 3/1921 | Hart ............................ | 292/239 |
| 2,846,172 | 8/1958 | Gutridge et al. ............. | 105/368(S) |
| 3,007,423 | 11/1961 | Maharick ..................... | 105/376 |
| 3,048,460 | 8/1962 | Herbst et al. ................ | 248/354X |
| 3,063,388 | 11/1962 | Magarian et al. ............. | 105/376 |
| 3,144,839 | 8/1964 | Palsson ........................ | 105/376 |
| 3,168,055 | 2/1965 | Vander Hyde et al. ....... | 105/376 |
| 3,176,629 | 4/1965 | Shaver ......................... | 105/376 |
| 3,191,546 | 6/1965 | Adler ........................... | 105/376 |
| 3,241,502 | 3/1966 | Magarian et al. ............. | 105/376 |
| 3,330,584 | 7/1967 | Kuellmar ..................... | 292/36 |

FOREIGN PATENTS

| 430,944 | 10/1945 | Canada |

Primary Examiner—Drayton E. Hoffman
Attorney—Harness, Dickey and Pierce

ABSTRACT: This application discloses an open frame freight-bracing bulkhead assembly having lock pins at its four corners for locking the bulkhead assembly in selective freight-bracing position. The lock pins are actuated by a common torque shaft that extends across the frame and which torque shaft may be operated by a respective operating handle assembly supported at either side of the frame. The operating handle assembly is comprised of a supporting bracket that is pivotally supported upon the frame and is connected by a link to the torque shaft for rotating it upon pivotal movement of the bracket. An elongated handle is slidably supported by the bracket and is movable from a first position wherein it may be operated through a face of the bulkhead to a second position wherein it extends outwardly of the side of the bulkhead assembly and may be actuated therefrom.

Patented March 16, 1971

INVENTOR.
Jackson A. Shook.
BY
Harness, Dickey & Pierce
ATTORNEYS

Patented March 16, 1971
3,570,416
3 Sheets-Sheet 2
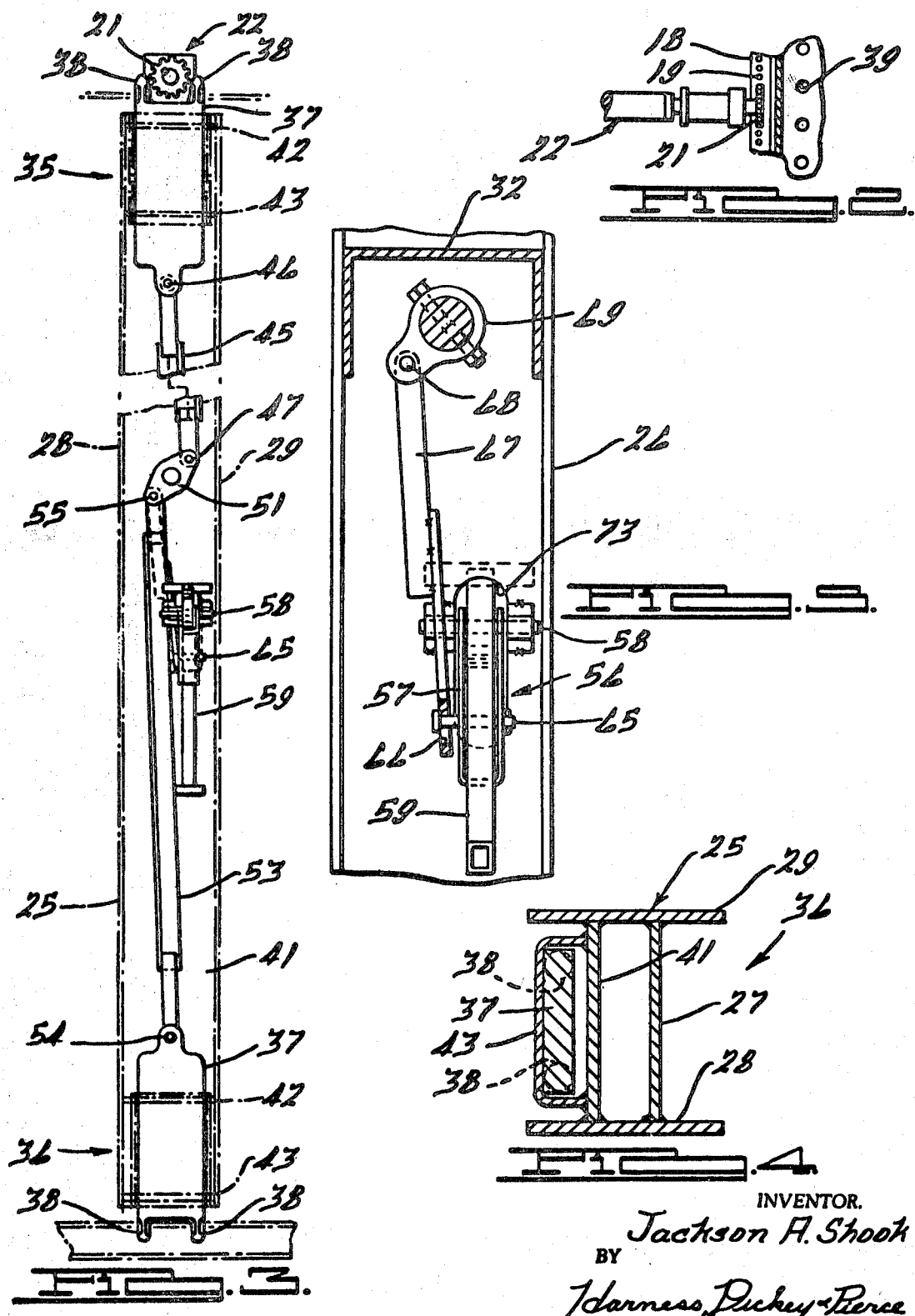

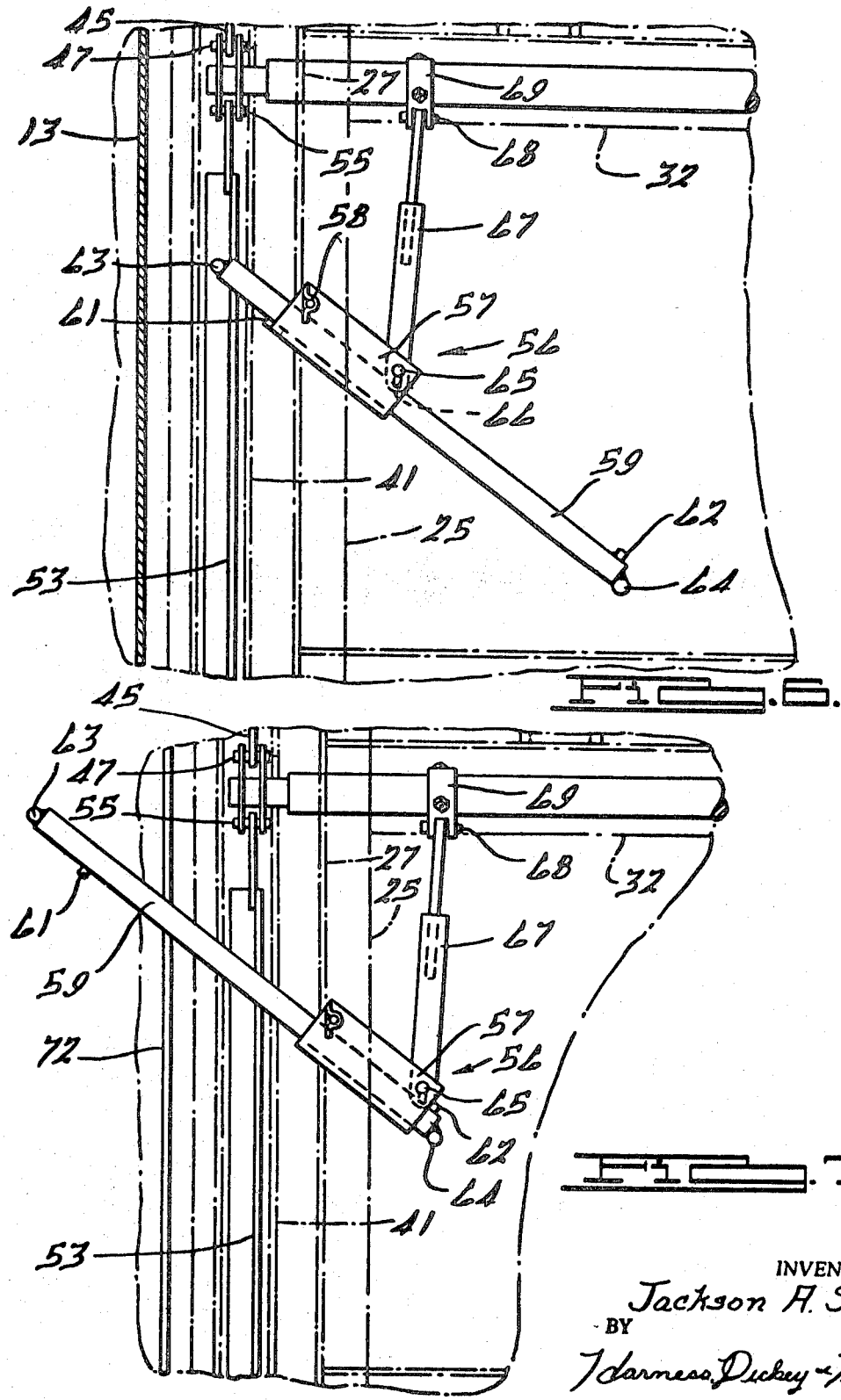

FREIGHT-BRACING APPARATUS

CROSS REFERENCE OF RELATED APPLICATION

This application is a continuation of my copending application of the same tie title, Ser. No. 482,576, filed Aug. 25, 1965, which application is now abandoned.

This invention relates to a freight-bracing apparatus for bracing freight within a cargo area and more particularly to an improved operating handle for actuating a latch mechanism that retains the freight-bracing apparatus in position.

The provision of adjustable bulkheads for bracing freight within cargo-carrying vehicles or storage areas is well known. The bulkhead is supported within the cargo area for movement to any of a plurality of freight-bracing positions and some form of latch mechanism is provided to lock the bulkhead in position. In a vehicle such as a railway car, the bulkhead frequently is used to brace freight positioned adjacent a doorway opening of the car. In positions adjacent the doorway opening it is desirable if the latch mechanism can be actuated from externally of the car. Although this can be accomplished by providing separate operating handles, the provision of the extra operating handles adds to the cost of the assembly and complicates the actuating linkage.

It is, therefore, a principal object of this invention to provide an improved operating handle assembly for operating the latch assembly for the freight-bracing bulkhead.

It is a further object of this invention to provide a single operating handle assembly that may be actuated from either internally of the storage area, or, alternatively, from a position externally of the storage area when the bulkhead is positioned adjacent an access opening of the storage area.

A freight-bracing apparatus embodying this invention is adapted to be supported for movement into at least one freight-bracing position within a cargo storage area. Latching means are carried at least in part, by the bracing apparatus for locking the bracing apparatus in its freight-bracing position. A release mechanism is connected to the latching means for actuating the latching means. The release mechanism includes an operating handle and a support bracket. The operating handle is supported by the support bracket for relative movement between first and second positions offering different access locations for grasping the operating handle and actuating the latching means.

Other objects and advantages of this invention will become more apparent as this description proceeds, particularly when considered in conjunction with the accompanying drawings, wherein:

FIG. 2 is a cross-sectional view taken along the line 2—2 of FIG. 1;

FIG. 3 is a cross-sectional view taken along the line of 3—3 of FIG. 1;

FIG. 4 is a cross-sectional view taken along the line 4—4 of FIG. 1;

FIG. 5 is a cross-sectional view taken along the line 5—5 of FIG. 1;

FIG. 6 is an enlarged view of the encircles area of FIG. 1; and

FIG. 7 is an enlarged view, in part similar to FIG. 6, showing the operating handle in another position.

Figure 1:
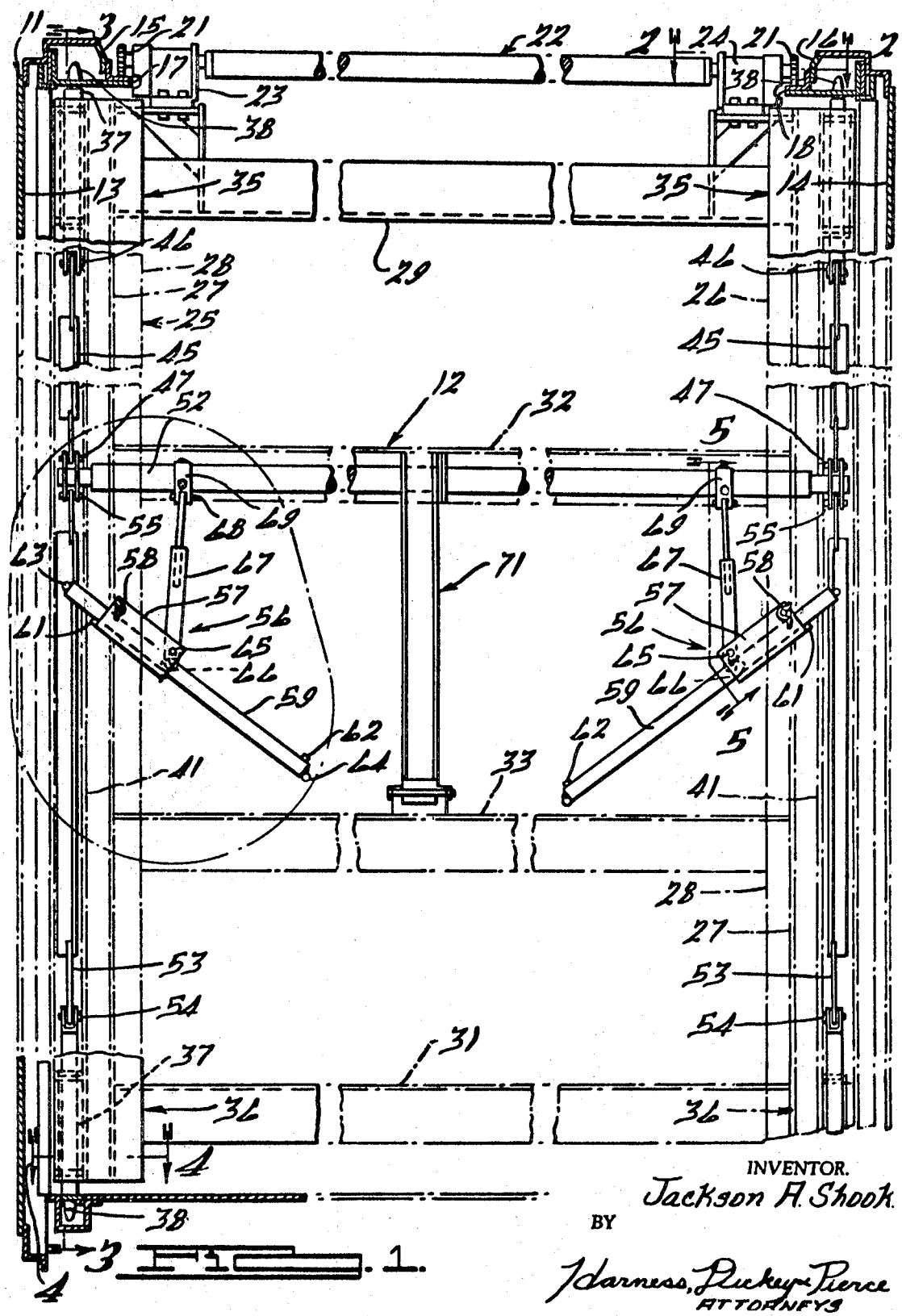
FIG. 1 is a cross-sectional view taken through a railway car embodying this invention.

Referring now in detail to the drawings, the reference numeral 11 indicates the body of a railway car or other freight-hauling vehicle. An adjustable bulkhead assembly, indicated generally by the reference numeral 12, is supported for longitudinal movement along the railway car 11 within a freight storage area defined by is its upstanding sidewalls 13 and 14 and floor. A pair of upper supporting track assemblies 15 and 16 are affixed to the upper ends of the sidewalls 13 and 14, respectively. The track assemblies 15 and 16 include horizontally extending track portions 17 and 18 in which a plurality of longitudinally spaced apertures 19 (FIG. 2) are formed. Sprockets 21 of a trolley beam assembly, indicated generally by the reference numeral 22, coact with the apertures 19 so that the trolley beam assembly 22 and bulkhead assembly 12 may be moved longitudinally of the railway car 11. The trolley beam assembly 22 is journaled upon the bulkhead assembly 12 adjacent its opposite ends by brackets 23 and 24 that are affixed to the upper end of the bulkhead assembly 12 in any known manner.

The bulkhead assembly 12 may be of any known type but is depicted as being open. That is, the bulkhead assembly 12 does not present a solid wall to the freight that is being braced but is comprised of a plurality of interconnected structural members that are adapted to engage the freight but permit limited access through the open portions of the bulkhead assembly. The bulkhead assembly is comprised of vertically extending side posts 25 and 26 of generally built up I-beam configuration comprised of a first or inner web 27 and flanges 28 and 29. Upper and lower horizontally extending channel-shaped members 29 and 31 span the side posts 25 and 26 and are rigidly connected as by welding thereto. Intermediate horizontally extending members 32 and 33 also bridge the vertically extending members 25 and 26. It should be readily apparent that the frame members 25, 26, 29, 31, 32 and 33 are spaced sufficiently close to engage freight within the railway car 11 but provide access openings through the bulkhead assembly 12.

Upper and lower latch mechanisms 35 and 36 are carried by each of the vertically extending side posts 25 and 26 for locking the bulkhead assembly 12 in any of a plurality of longitudinally spaced freight-bracing positions within the railway car 11. Each latching mechanism 35 and 36 includes a locking pin forging 37 (FIG. 3) that has a pair of outwardly extending pins 38 that are adapted to be received in spaced apertures 39 formed in the supporting tracks 15 and 16 at the upper end of the railway car 11 and longitudinally spaced apertures (not shown) formed along the floor at opposite sides of the railway car 11. The locking pin forgings 37 are slidably supported adjacent an outer web 41 of the side posts 25 and 26 by a pair of brackets 42 and 43 (FIG. 4) that are welded to each end of the webs 41.

Each of the upper locking pin forgings 37 is connected at its lower end to an operating link 45 by means of a pivot pin 46. The lower end of the link 45 is pivotally connected, by means of a pivot pin 47 to a bellcrank 51 that is rigidly affixed to the outer end of a torsion bar 52 that is journaled upon the bulkhead assembly 12 in any suitable manner adjacent the horizontally extending frame member 32. The upper end of each of the lower pin forgings 37 is connected to the lower end of an operating link 53 by means of a pivot pin 54. The upper end of the lower operating link 53 is connected to the bellcrank 51 by means of a pivot pin 55. It should be readily apparent that rotary motion of the torsion bar 52 is accompanied by vertical movement of the locking pin forgings 37 through the bellcrank 51 and operating links 45 and 53.

An operating handle assembly, indicated generally by the reference numeral 56, is provided at each side of the bulkhead assembly 12 for rotating the torsion bar 52 and actuating the latching mechanisms 35 and 36. Each of the operating handle assemblies 56 comprises a supporting bracket or yoke 57 of generally channel shape that is pivotally connected at one of its ends to the inner web 27 of the respective side post by means of a pivot pin 58. An elongated operating handle 59 of generally rectangular tubular configuration is slidably supported within the yoke 57. Stop blocks 61 and 62 are affixed to opposite ends of the operating handle 59 so that it cannot be removed from the supporting yoke 57. Stop blocks 61 and 62 are positioned adjacent opposite ends of the operating handle 59 so as to limit the sliding movement of the handle 59 within its supporting yoke 57. Upper and lower grasp rods 63 and 64 are fixed, as by welding, to opposite ends of the operating handle 59.

A pin 65 is affixed to each of the support yokes 57 adjacent its lower end. The pin 65 is received in an elongated slot 66 formed in the lower end of an actuating link 67. The upper end of each actuating link 67 is connected by means of a pivot pin 68 to a yoke 69 that is rigidly affixed to the respective end of the torsion bar 52. A biasing spring assembly, indicated generally by the reference number 71, is affixed to the torsion bar 52 between the yokes 69 to bias the latching mechanisms 35 and 36 into their engaged positions.

FIGS. 1 through 6 show the bulkhead assembly 12 in a freight-bracing position with the latch mechanism 35 and 36 engaged. To release the latch mechanisms 35 and 36 and slide the bulkhead 12 with respect to the railway car 11, either of the operating handles 59 may be grasped at its lower end and raised. The pin 65 then urges the actuating link 67 upwardly to rotate the yoke 69 and torsion bar 52. The other operating handle 59 will not be moved since the slot 66 functions as a lost motion connection between link 67 and pin 65. It should be clear, therefore, that all of the latching devices 35 and 36 may be operated concurrently by either operating handle assembly 56 without motion of the supporting yoke 57 and operating handle 59 of the other operating handle assembly.

To continue with the operation, the rotary motion of the torsion bar 52 operates through the upper and lower actuating links 45 and 53 to release the locking pin forgings 37 from the respective apertures in the car so that the bulkhead assembly 12 may be slid longitudinally. When the desired freight-bracing position is reached, the operating handle assembly is rotated in the opposite direction to that previously described and the locking pin forgings 37 will again be brought into registry with the appropriate apertures. The spring assembly 71 assists in the latching operation.

As is common in railway cars, access openings or doorways 72 (FIG. 7) are formed at one or more spaced locations in the sidewalls 13 and 14. When the bulkhead assembly 12 is adjacent the doorway opening 72, it is desirable to release the latching mechanisms 35 and 36 externally of the railway car through the doorway opening 72. This may be accomplished by grasping the upper grip rod 63 that extends through an elongated opening 73 formed in the web 41 of each of the side posts 25 and 26. The operating handle 59 may then be slid upwardly with respect to its supporting yoke 57 through the opening 73 until the stop block 62 strikes the yoke 57 (FIG. 7). This extension of the operating handle 59 permits easier access and gives greater leverage to the operator. The supporting yoke 57 may then be pivoted about its supporting pivot pin 58, as previously described, to release the locking devices 35 and 36.

When the operating handle 59 is slid within its supporting yoke 57 between its inner access position (FIG. 6) and its outer access position (FIG. 7) the latching mechanisms 35 and 36 will not be effected since the movement of the operating handle 59 takes place along an axis normal to the pivotal axis of the yoke 57. The operating handle 59 and supporting yoke 57 may be rotated about the pivotal axis defined by the pivot pin 58 in either position to actuate the latching mechanisms 35 and 36.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

I claim:

1. A freight-bracing bulkhead assembly comprising a frame, locking means carried by said frame for movement between an engaged position and a disengaged position, said frame including a side member defining a surface extending substantially normally to the freight-engaging face of said bulkhead and defining a relatively small vertically extending opening therein, a supporting bracket supported upon said frame for pivotal movement about an axis disposed closely adjacent said opening, operating means responsive to the movement of said supporting bracket for moving said locking means between its engaged and disengaged positions upon pivotal movement of said supporting bracket about said axis, an elongated operating handle supported for sliding movement by said supporting bracket from a first operative position to a second operative position without effecting a pivotal movement of said supporting bracket about said axis, and means defining an access opening in the freight-engaging face of said bulkhead juxtaposed to one end of said operating handle when said operating handle is in its first operative position for simultaneous pivotal movement of said operating handle and its associated supporting bracket about said axis for operating said locking means, the other end of said operating handle being juxtaposed to said vertically extending opening in said frame side member when said operating handle is in its first operative position, said operating handle being slidable from its first operative position to a second operative position extending outwardly of said frame side member and having a substantial portion of its length extending through said vertically extending opening by grasping of said other end from the side of said bulkhead for operation of said locking means from said side of said bulkhead, said vertically extending opening having sufficient vertical extent for pivotal movement of said operating handle about said axis when said operating handle is in either of said positions.

2. A freight-bracing bulkhead assembly as set forth in claim 1 wherein the frame further includes a second side member at the opposite side of said bulkhead, said second side member having a relatively small vertically extending opening therein, and a second supporting bracket and second elongated operating handle as defined in claim 1 associated with said second side member for operating said locking means adjacent said second side member.

3. A freight-bracing bulkhead assembly as set forth in claim 1 in combination with a railway car or the like defining a cargo storage area, means for supporting said bulkhead assembly for movement along said storage area, a doorway opening formed in one sidewall of said cargo area, said bulkhead assembly being adapted to be positioned adjacent said doorway opening in at least one of its freight-bracing positions, said operating handle being adapted to extend at least in part through said doorway opening when said operating handle is in its second operative position for actuation of said locking means externally of said cargo area.

4. A freight-bracing bulkhead assembly as set forth in claim 1 wherein the locking means comprises lockpins supported at the corners of the frame, the operating means comprising a torsion bar extending across said frame, linkage means operatively connecting the opposite ends of said torsion bar to the respective of said lockpins for operating said lockpins upon rotation of said torsion bar, a link pivotally connected at one end to the supporting bracket, and means pivotally connecting the other end of said link to said torsion bar at a point offset from its rotational axis for rotating said torsion bar upon pivotal movement of said supporting bracket about its axis.